Nov. 21, 1967  J. H. JOHNSTON  3,353,387
METHOD OF MAKING COMPOSITE TUBULAR ARTICLES
Original Filed Feb. 26, 1963
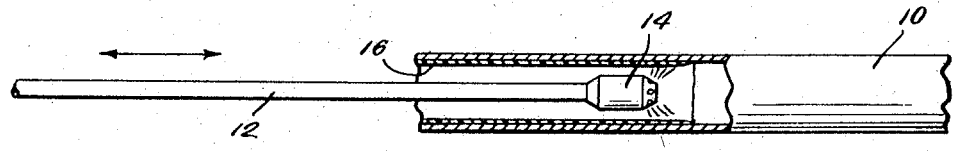
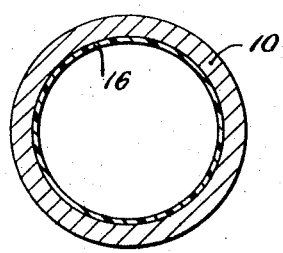
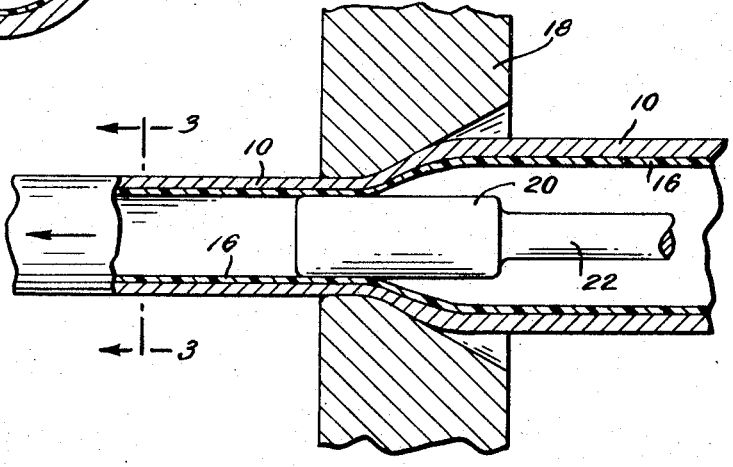
INVENTOR,
JAMES H. JOHNSTON,
BY Edward J. Connors ATT'Y.

United States Patent Office 3,353,387
Patented Nov. 21, 1967

3,353,387
METHOD OF MAKING COMPOSITE TUBULAR ARTICLES
James H. Johnston, Rehoboth, Mass., assignor to Texas Instruments Incorporated, Dallas, Tex., a corporation of Delaware
Original application Feb. 26, 1963, Ser. No. 261,135. Divided and this application Aug. 24, 1964, Ser. No. 391,809
3 Claims. (Cl. 72—46)

ABSTRACT OF THE DISCLOSURE

A composite tubular article formed of a layer of metal coated on its interior with a plastic is formed by cleaning the inside of the metal tube, spraying a solution of plastic in uncured condition and a fluid carrier on the interior of the tube, heating the tube and interior plastic layer to evaporate the fluid carrier and to partially cure the plastic layer and subsequently reducing the plastic-metal assembly by drawing through a draw die to effect a reduction of approximately 25% thereby producing a layer of plastic within the range of approximately 0.001–0.004" which is substantially non-porous.

---

This application is a division of the copending application Ser. No. 261,135, filed Feb. 26, 1963, for "Composite Tubular Articles and Method of Making Same," and relates to a method of making composite tubular articles and more particularly to a method of making metallic piping or tubing clad with a relatively thin and substantially impervious layer of cororsion resistant plastic material.

Among the several objects of this invention may be noted the provision of a method of making composite articles comprising a layer of metal having a relatively thin but substantially impervious layer of oxidation-resistant plastic tenaciously adhered and bonded thereto; the provision of a method of making composite articles which are in the form of tubing or piping and wherein the plastic layer is of such order of thinness as to not significantly influence or affect the heat transfer properties of the tubing or piping; the provision of a method of making such composite tubing or piping which is low cost and can be easily and economically manufactured.

Other objects and features will be in part apparent and in part pointed out hereinafter.

The invention accordingly comprises the elements and combinations of elements, steps and sequence of steps, features of construction and manipulation, and arrangements of parts, all of which will be exemplified in the structures and methods hereinafter described, and the scope of the application of which will be indicated in the following claims.

In the accompanying drawings in which one of the various possible embodiments of the invention is illustrated:

FIG. 1 is an elevational view diagrammatically illustrating one step in the method of making composite tubing according to this invention;

FIG. 2 is a sectional view diagrammatically illustrating another step according to the method of this invention; and FIG. 3 is a sectional view taken on line 3—3 of FIG. 2 showing a completed composite tube.

Similar reference characters indicate corresponding parts throughout the several views of the drawings.

Dimensions of certain of the parts as shown in the drawings may have been modified and/or exaggerated for the purposes of clarity of illustration.

The term "plastic" as employed throughout the specification and claims means oxidation resistant plastic material such as "Teflon" and "FEP" and the like. Teflon and FEP are trade names of the E. I. du Pont de Nemours & Co., respectively, for a plastic consisting of a tetrafluoroethylene polymer, and a plastic consisting of a hexafluoropropylenetetrafluoroethylene copolymer. The term "uncured condition" as used herein in reference to plastic is intended to mean plastic which is not substantially completely cured and also includes plastic which has been partially cured.

In the past it has been proposed to line metallic pipe and tubing or flow lines such as are used to conduct or transport corrosive fluids, with a plastic or Teflon lining sleeve to provide a corrosion resistant barrier between the corrosive fluids and the metallic piping. The proposed linings are generally relatively thick, on the order of $\frac{1}{32}$ of an inch or so. Such prior linings have generally been limited to a minimum thickness of about 0.010 inch, since below this thickness, plastics such as Teflon, are generally porous or permeable to fluids. Porosity exposes the metallic piping to chemical and corrosive attack and in many cases also results in peeling or separation of the plastic from the piping. Another characteristic of Teflon or like materials, particularly in thicknesses greater than about 0.010 inch, is that they act as a barrier to heat or as a thermal insulator. Piping or tubing provided with the relatively thick Teflon liners or sleeves, according to prior proposals, are thus generally not useful for heat exchanger applications where heat transfer through the tubing or piping is required. Further, such relatively thick Teflon linings, in addition to being relatively expensive, are also often times unsuitable where relatively small tubing dimensions are required.

The present invention contemplates the provision of metallic tubing or piping having a relatively thin yet substantially impervious layer of corrosion resistant plastic tenaciously adhered and firmly bonded to the tubing which plastic layer, because of its thinness does not significantly influence or affect the heat transfer properties of the tubing.

Composite tubing according to this invention, as shown in FIG. 3, comprises a metallic tube 10 which may be formed of a metal susceptible to oxidation, such as steel or brass, with a layer of plastic 16 tenaciously adhered and bonded thereto. According to the invention, the plastic layer 16 is substantially non-permeable or non-porous and has a thickness ranging from approximately 0.0001 inch to slightly less than 0.010 inch. The preferred thickness range for plastic layer 16 according to the invention is approximately 0.0001 inch to about 0.004 inch. The plastic layer 16 in addition to being substantially impervious to corrosive fluids or media also (particularly in the preferred thickness range) does not significantly influence or affect the heat transfer properties of tube 10 and permits substantial material economy.

Referring now to FIG. 1 there is illustrated a first step according to the method of this invention for producing the composite tubing described above. While the present invention is applicable to coating or cladding the inside and/or outside of tube 10, the invention will be described and illustrated with regard to cladding the inside of tube 10 with plastic layer 16.

According to the method of this invention, the surfaces of metal tube 10 to be clad (e.g., the inside of the tube 10, as shown in FIG. 1) are cleaned, for example, as by scrubbing or brushing, to remove barriers to bonding. Next, a relatively thin layer of plastic is applied to the cleaned surfaces, for example, by painting, spraying or pouring. Spraying is the preferred method. In FIG. 1 there is diagrammatically illustrated an example of suitable apparatus which may be used for this purpose, which comprises a pipe or tube 12 connected at one end with a spray nozzle applicator 14. The other end of pipe 12 is connected with a supply of a plastic material in solution form (not shown). The plastic to be sprayed is in an uncured condition and in the form of a colloidal suspension, a suitable example of which is 7½ pounds of Teflon combined with 4½ pounds of water to provide a solution containing 7½ pounds of Teflon per gallon of solution.

Nozzle 14 is telescopically disposed within tube 10, and is moved relative to tube 10 (in the direction of the arrow shown in FIG. 1) at such a speed so as to deposit a relatively thin layer of the plastic in solution form on the entire inner wall surface of the tube 10.

After wiping or removing the excess plastic solution, the coated tube is subjected to a heating step to evaporate the water or fluid carrier of the colloidal suspension to leave an adherent coating or layer of plastic on the inner walls of the tube which is shown on the right-hand side of the draw die 18 in FIG. 2. If desired, the colloidal suspension or solution can also include an adhesive agent to aid in achieving a stronger adherence between the plastic 16 and the tube 10. Further, if desired, the heating and evaporating step may also be used to partially cure the plastic material. A suitable example of a partial curing and evaporating step is at a temperature of about 500° F. for a period of about 10 minutes.

The relatively thin deposited plastic layer 16 which remains after the partial curing and/or evaporation step may, for example, be on the order of about 0.001 inch or so in thickness.

The composite tube is then subjected to a drawing step as shown in FIG. 2. A stationary short mandrel or arbor 20 is telescopically disposed within tube 10 and has its forward free end portion adjacent the smaller diameter portion of draw die 18. The other end of arbor 20 is fixedly attached to the forward end of a stationary and fixed arbor or plug rod 22. The composite tube assembly resulting from the evaporation step is passed or pulled through die 18 about arbor 20 in the direction of the arrow shown in FIG. 2. The drawing step generates sufficient heat and effects a sufficient reduction in the composite thickness of tube 10 and layer 16 to tenaciously adhere and firmly bond plastic layer 16 to tube 10. The radial pressures exerted on the composite tube while the latter is being drawn through the circular orifice of die 18, also serves to squeeze layer 16 against arbor 20 to deform or smear plastic layer 16 to substantially eliminate porosity or permeability therein. Further, the pressure and heat developed during the drawing operation also serves to substantially completely cure the plastic layer. An example of a suitable composite thickness reduction resulting from the drawing operation to obtain the advantageous results of this invention for a steel tube clad with a Teflon layer corresponds to about a 20 to 25% reduction in the cross sectional area of the tube.

The resulting composite product is shown in cross section in FIG. 3 and has a relatively thin (i.e., on the order of 0.0001 to 0.010 inch) plastic layer 16 which is substantially non-porous and impervious to fluid penetration, and is tenaciously adhered and firmly bonded to the tube 10. While I do not wish to be bound to any theories, it is believed that the tenacious adherence between the tube 10 and layer 16 results from an interatomic bond or a so-called homopolar bond developed between the layers during the heating and drawing operations.

If desired, tube 10 and layer 16 may be preheated prior to entering the draw die 18, so that the preheating plus the heat developed during drawing will chemically cure or complete the curing of the plastic material and contribute to eliminating porosity or permeability in the plastic layer. An example of a suitable preheating temperature is about 250° F. The surface lubricating properties of the plastic layer 16, particularly that of Teflon, advantageously facilitates the drawing operation.

If desired, the partial curing step described above (prior to the drawing step) may be combined, in some cases, with the drawing step utilizing the heat generated on drawing (and any preheating) for curing the plastic material. However, it should be understood that drying and evaporation of the fluid carrier of the colloidal suspension must be completed before the drawing operation.

It will thus be seen that the heat and pressure to which the composite tube is subjected during the drawing operation advantageously results in (1) fabricating the tube to desired dimensions; (2) strengthens the adherence and bond between the plastic layer 16 and tube 10; (3) chemically cures or completes the curing of the plastic layer 16; and (4) substantially eliminates porosity and permeability in the plastic layer to assure that the inner surface of tube 10 is completely and protectively covered by the plastic layer 16.

The following example illustrates the invention: The inside wall surface of a steel tube having a starting wall thickness of 0.120 inch, an outside diameter of 1.00 inch, and an inside diameter of 0.760 inch, was cleaned by brushing to remove barriers to bonding. A layer of uncured Teflon in colloidal suspension form was applied on the entire cleaned inside surface of the tube. The colloidal suspension consisted of about 7½ pounds of Teflon per gallon of solution. After wiping the excess Teflon colloidal suspension from the coated tube assembly, it was then subjected to a heating and partial curing step at a temperature of about 500° F. for about 10 minutes which resulted in evaporating the colloidal suspension carrier (i.e., water) and in particularly curing the Teflon, leaving a layer of Teflon about 0.002 inch thick deposited on the inside of the tube. The assembly was then subjected to a drawing step such as shown in FIG. 2 and described above, which resulted in about a 24% reduction in the cross sectional area of the metal and Teflon layers. The finish wall thickness of the metal tube was about .109 inch, the inside diameter was about .657 inch, the outside diameter was about .8754 inch, and the thickness of the plastic layer was about .0002 inch. The plastic layer was reduced in thickness to a considerably greater extent than was the metal tube because of elimination of substantially all porosity in the plastic due to compaction and smearing of the plastic layer.

The plastic layer was firmly and tenaciously bonded to the metal tube. The completed composite tube was then tested by pouring and confining a solution containing 50% $HNO_3$ and the remainder water in the tube for a period of about 30 minutes. Under these conditions an improperly bonded or porous plastic layer will result in a chemical attack on the metal tube which will be evidenced by the evolution of gas bubbles and can result in loosening or separation of the plastic layer. The test conducted on this sample showed no evidence of chemical attack on the metal and showed the plastic layer to be impervious to the test solution.

It will be seen from the above that the composite tubing produced according to the present invention provides a relatively thin and economical layer of plastic which, in spite of its thinness, is substantially impervious or non-porous to corrosive fluids which affords an inert barrier to chemical or corrosive attack on the metal of the tube. Further, because of its thinness, the plastic layer does not significantly influence the heat transfer properties of the tube, thus rendering the tubing particularly useful for heat exchanger applications as well as for other applications which may or may not require particular heat transfer properties.

The plastic cladding layer, in spite of its thinness after being bonded to the metal tube, retains its lubricating or so-called "non-sticking" properties as well as its characteristic of not being wetted by water. This has the advantage of preventing buildup of dirt and micro-organisms on the inside of the tubing which could otherwise adversely affect the heat transfer and flow properties of the tube.

In view of the above, it will be seen that the several objects of the invention are achieved, and other advantageous results attained.

As many changes could be made in the above constructions and methods without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

I claim:

1. The method of making a composite tubular article comprising the steps of providing a tubular metal member; cleaning the inside surface of said metal member to remove barriers to bonding; applying to said cleaned surface, as by spraying, a layer of a colloidal suspension containing a carrier fluid and a plastic in an uncured condition selected from the group consisting of a tetrafluoroethylene polymer and a hexafluoropropylenetetrafluoroethylene copolymer; heating the assembly of said metal member and plastic layer at a temperature of about 500° F. for a period of about 10 minutes to evaporate the fluid carrier of said colloidal suspension to particularly cure the plastic material; subsequently heating and passing said assembly through a draw die with a stationary arbor inserted in said assembly and located adjacent said die to substantially cure and eliminate porosity in said plastic layer, and to bond said plastic layer to said metal member; said drawing step also squeezing said plastic layer against said arbor to effect a reduction in the cross sectional area of said metal member and plastic layer of about 20–25% and to reduce the thickness of said plastic layer to lie within the range of approximately 0.0001 inch to less than 0.004 inch.

2. The method as set forth in claim 1 and wherein said metal member is formed of steel.

3. The method as set forth in claim 1 and wherein said metal member is formed of brass.

References Cited
UNITED STATES PATENTS

| | | | |
|---|---|---|---|
| 1,283,692 | 11/1918 | De Benedetti | 72—370 |
| 2,724,672 | 11/1955 | Rubin | 156—287 |
| 2,850,999 | 9/1958 | Kaplan et al. | 29—528 |
| 2,885,777 | 5/1959 | Gliss | 72—370 |
| 3,206,848 | 9/1965 | Rentmeester | 29—528 |

CHARLES W. LANHAM, *Primary Examiner.*

E. M. COMBS, *Assistant Examiner.*